United States Patent [19]
Arroyo et al.

[11] Patent Number: 5,802,355
[45] Date of Patent: Sep. 1, 1998

[54] MULTI-PROCESSOR SYSTEM USING PROCESSORS OF DIFFERENT SPEEDS

[75] Inventors: Ronald Xavier Arroyo; Khuong Huu Pham, both of Austin, Tex.

[73] Assignee: International Business Machines Corporation, Armonk, N.Y.

[21] Appl. No.: 762,907

[22] Filed: Dec. 10, 1996

[51] Int. Cl.⁶ .................. G06F 15/16; G06F 1/04
[52] U.S. Cl. ................................................ 395/553
[58] Field of Search .................... 395/553, 200.78

[56] References Cited

U.S. PATENT DOCUMENTS

| | | | |
|---|---|---|---|
| 4,689,581 | 8/1987 | Talbot | 331/1 A |
| 4,893,271 | 1/1990 | Davis et al. | 364/900 |
| 5,077,686 | 12/1991 | Rubinstein | 395/550 |
| 5,163,146 | 11/1992 | Antanaitis, Jr. et al. | 395/550 |
| 5,381,543 | 1/1995 | Blomgren et al. | 395/550 |
| 5,491,814 | 2/1996 | Yee et al. | 395/550 |
| 5,506,981 | 4/1996 | Madter | 395/550 |
| 5,537,581 | 7/1996 | Conary et al. | 395/550 |
| 5,537,660 | 7/1996 | Bond et al. | 395/878 |
| 5,542,083 | 7/1996 | Hotta et al. | 395/550 |

*Primary Examiner*—Thomas M. Heckler
*Attorney, Agent, or Firm*—Volel Emile

[57] ABSTRACT

A method and apparatus of allowing processors of different speeds to be used in a multi-processor system are disclosed. The method and apparatus comprise a programmable array logic (PAL) or field programmable gate array (FPGA) that detects each of the processors maximum speed and selects a speed common to all of the processors as the operating speed of the processors. The method and apparatus also adjust the system clock to match the speed of the processors.

18 Claims, 3 Drawing Sheets

MULTI-PROCESSOR SYSTEM USING PROCESSORS OF DIFFERENT SPEEDS

BACKGROUND OF THE INVENTION

1. Field of the Invention

The present invention relates generally to a multi-processor system, and more particularly, to a multi-processor system employing processors with different maximum speeds of operation.

2. Description of the Related Art

Many modern computer systems are symmetrical multi-processor systems. In a symmetrical multi-processor system, each processor is used to perform a particular task. For example, each processor may be used to work on a different set of instructions of a process or on a different process altogether, or each processor may be designed and used to handle certain tasks with a high degree of efficiency. As can be surmised, the use of more than one processor in a computer system, often times, enhances the system's performance.

Some computer manufacturers provide symmetrical multi-processor computer systems with replaceable processors. The processors most often reside each on a daughter card that is pluggable onto the motherboard of the computer system via a connector. Thus, when a processor malfunctions or needs to be upgraded, it can be easily replaced by a new processor. The new processor, however, must operate at the same speed as the other processors to comply with the architecture of a symmetrical multi-processor system.

As is well known, the operating speed of processors is ever so increasing. For example, processor speeds that are standard today may well be obsolescent in a year or so. Hence, replacing a processor with one that operates at the same speed may increasingly be difficult as time goes by. Consequently, there may come a time when replacing a failed processor will necessitate replacing all the other processors in the computer system to ensure the system's operability. Replacing all the processors of a multi-processor system because of a failed processor is a relatively expensive proposition.

Therefore, there is a need in the art for an apparatus and method of using multiple processors of different speeds of operation in a computer system.

SUMMARY OF THE INVENTION

The need in the art is addressed by the present invention. The present invention provides an apparatus of allowing processors of different speeds to be used in a multi-processor system. In one embodiment of the invention, the apparatus comprises a programmable array logic (PAL) or field programmable gate array (FPGA) that detects each of the processors' maximum speed and selects a speed common to all of the processors as the operating speed of the processors.

In another embodiment of the invention, the apparatus adjusts the system clock to match the speed of the processors.

DESCRIPTION OF THE INVENTION

Figure 1:
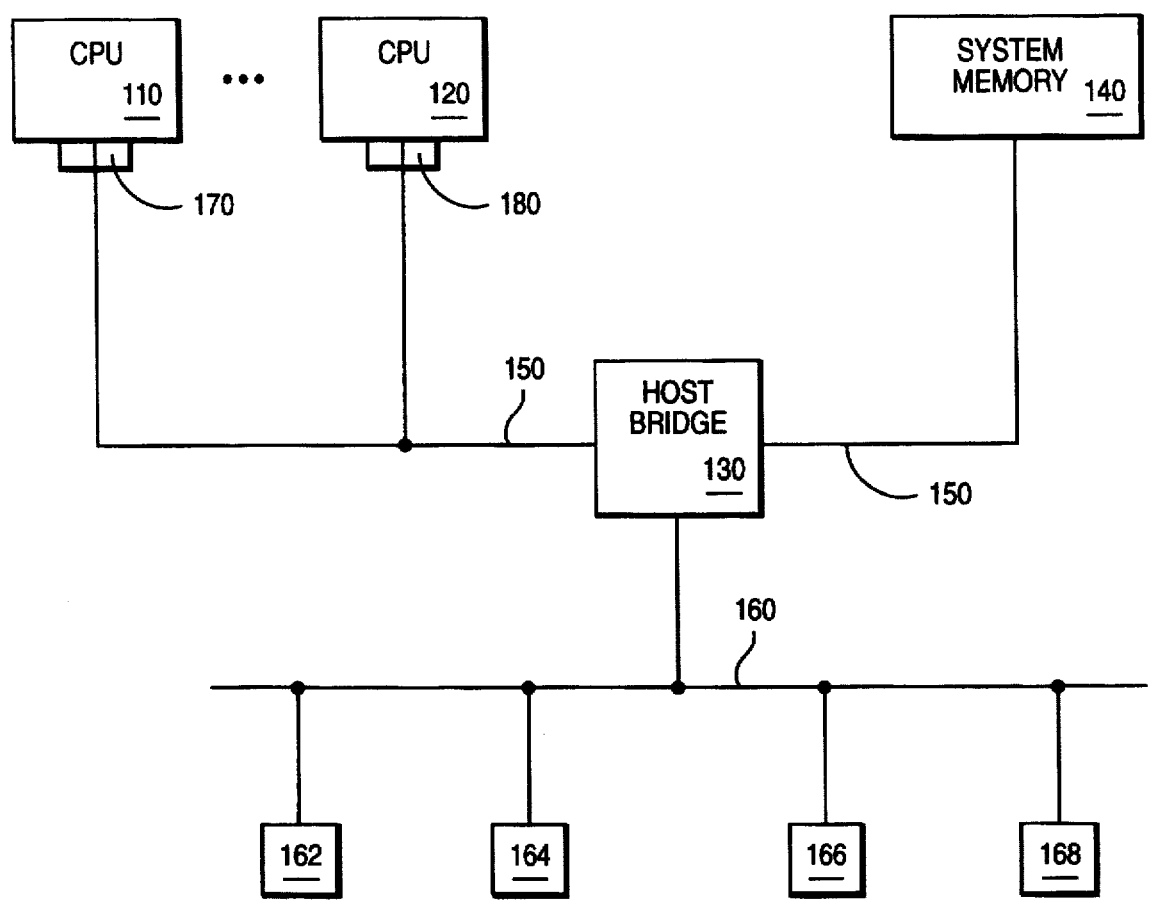
FIG. 1 is a block diagram of a computer system 100 employed in a preferred embodiment of the invention.

FIG. 1 is a block diagram of a computer system 100 employed in a preferred embodiment of the invention. Such computer may take the form of a workstation such as the RS/6000 systems marketed by the IBM Corporation, although the invention is not intended to be so limited and is equally applicable to essentially any computer system.

Still referring to FIG. 1, the computer system 100 contains a plurality of central processing units (CPUs) 110 and 120 connected to a system memory 140 through a host bridge 130 on system bus 150. The host bridge is connected to a peripheral component interconnect (PCI) bus 160 having PCI devices 162–168 attached thereto. The PCI devices may comprise any of the following: graphics adapters, communication adapters, network adapters, compact disk, floppy disk, hard disk drives etc. The CPUs 110 and 120 are each connected to the computer system 100 using connectors 170 and 180, respectively.

Figure 2:
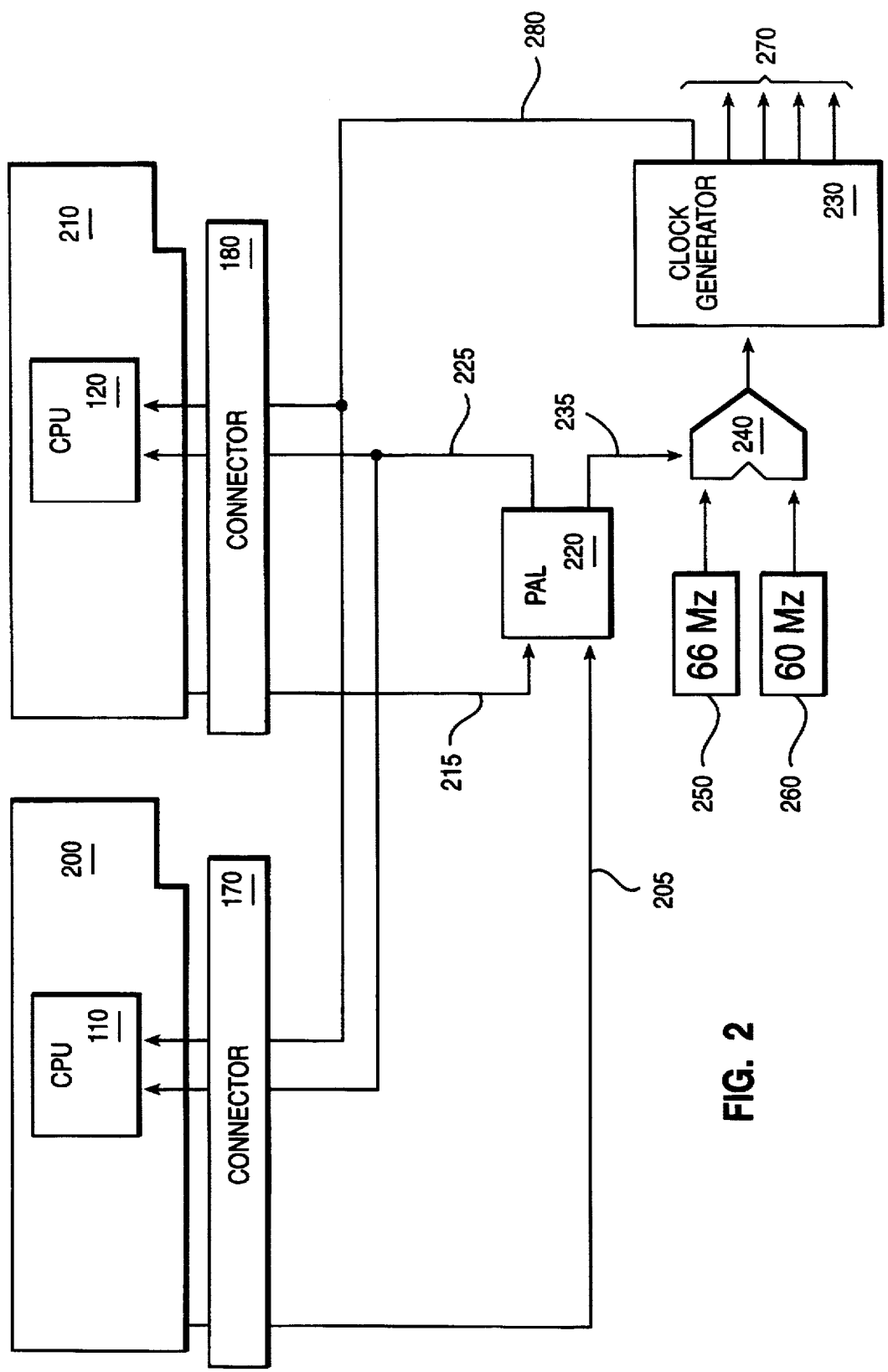
FIG. 2 is a block diagram of the processors and circuitry employed in the present invention.

FIG. 2 is a block diagram of the processors and circuitry employed in the present invention. The circuitry entails a programmable array logic (PAL) 220 connected to both the processors 110 and 120 via connectors 170 and 180. The connectors 170 and 180 have a plurality of pins. The PAL 220 is also connected to a multiplexer 240. The multiplexer has two inputs: a 66 MHz and a 60 MHz oscillator 250 and 260. The output of the multiplexer 240 is connected to a clock generator 230. The clock generator has a plurality of outputs 270, one of which is connected to the processors 110 and 120.

According to the preferred embodiment of the invention, four of the plurality of the pins of each of the connectors, presence detect pins 0 to 3 (or PD[0 . . . 3]), are used to detect the presence as well as the speed of each of the processors 110 and 120. The values of the four pins are defined as shown in table 1 below.

TABLE 1

| PD [0 . . 3] | CPU WITH MAX. FREQ. |
|---|---|
| 0000 | 66 MHz |
| 0001 | 100 MHz |
| 0010 | 120 MHz |
| 0011 | 133 MHz |
| 0100 | 150 MHz |
| 0101 | 166 MHz |
| 0110 | 180 MHz |
| 0111 | 200 MHz |
| 1111 | NO CARD PRESENT |

The values of the four pins are provided to the PAL 220 over signal lines 205 and 215. Normally, the values of the pins from each of the connectors 170 and 180 would match since both processors would have the same maximum speed. If, however, the values do not match, it is an indication that the processors 110 and 120 do not have the same maximum speeds. The PAL 220 then selects the slowest of the two speeds as the operating speed of the processors. The PAL 220 also selects the proper frequency of the system clock by providing a signal to the multiplexer 240 over line 235. Once the proper frequency is fed to the clock generator 230, the generator 230 outputs the proper system clock. The system clock is then provided to the processors 110 and 120 over line 280. Each processor speed chosen by the PAL 220 has associated with it a multiplier that is based on the maximum bus frequency that the system will support. The following two tables illustrate how a particular system would set the multipliers based on the maximum system bus frequency.

TABLE 2

| CPU SPEEDS (MHz) | N_PD [0..3] | MAXIMUM SYSTEM BUS FREQ. (MHZ) | | |
|---|---|---|---|---|
| | | 50 | 60 OR 66 | 66 |
| 66 | 0000 | 1:1 | 1:1* | 1:1 |
| 100 | 0001 | 2:1 | 1.5:1* | 1.5:1 |
| 120 | 0010 | 2:1 | 2:1** | 1.5:2 |
| 133 | 0011 | 2.5:1 | 2:1* | 2:1 |
| 150 | 0100 | 3:1 | 2.5:1** | 2:1 |
| 166 | 0101 | 3:1 | 2.5:1* | 2.5:1 |
| 180 | 0110 | 3.5:1 | 3:1** | 2.5:1 |
| 200 | 0111 | 4:1 | 3:1* | 3:1 |

* = at 66 MHz; ** = at 60 MHz

TABLE 3

| N_PD [0..3] | PLL_config [0..3] |
|---|---|
| 0000 | 0000 |
| 0001 | 1100 |
| 0010 | 0100 |
| 0011 | 0100 |
| 0100 | 0110 |
| 0101 | 0110 |
| 0110 | 1000 |
| 0111 | 1000 |

The multipliers or ratios are used by the processors to operate at the speed selected by the PAL 220 using the system bus clock. For example, suppose processor 110 has a maximum speed of 133 MHz and processor 120 has a maximum speed of 166 MHz. Once the computer system 100 is turned on or is reset, processor 110 would provide a 0011 signal to the PAL 220 and processor 120 would provide a 0101 signal. The PAL 220 then selects 133 MHz as the operating speed of the two processors. Consequently, the PAL 220 will generate a 0011 signal as the new presence detect bits (i.e., N_PD[0...3]). Using Table 3 as a look-up table, the PAL 220 will send 0100 as the PLL_config[0...3] signal to the processors to configure the phase locked loop (PLL) of each processor. Phase locked loops are used to construct frequency multipliers. U.S. Pat. No. 4,689,581, whose disclosure is incorporated herein, discloses an implementation of a PLL circuit.

As shown in Table 2, this signal instructs the PLL of each processor to multiply the clock signal by 2.5 if the system bus frequency is 50 MHz or by 2 if the bus frequency is 66 MHz. In the present embodiment, since the system bus frequency can either be 60 or 66 MHz, the PAL 220 selects oscillator 250 (i.e., 66 MHz) since the processors will be able to operate closer to the 133 MHz speed using the 66 MHz clock rather than the 60 MHz clock.

The PAL 220 uses the following algorithm to generate the N_PD[0...3] bits:

```
win0 (0) = 1;
win1 (0) = 1;
N_PD (0) = PD0 (0) & PD1 (0);
for (i=1; i<4; i++)
{/* calculate which terms to use to calculate the New PD bits */
win0 [i] = win0 (i-1) & [ N_PD (i-1) | ( win0 (i-1) & !PD0 (i-1) ) ];
win1 [i] = win1 (i-1) & [ N_PD (i-1) | ( win1 (i-1) & !PD1 (i-1) ) ];
/* calculate the New PD bits */
N_PD (i) = ( !win0 (i) | PD0 (i) ) & ( !win1 (i) | PD1(i) );
};
```

PD0 [0...3] are the presence detect bits of the first processor and PD1[0...3] are those of the second processor. The win0 (i) term is associated with the first processor and the win1(i) term is associated with the second processor.

Using the example above, therefore, PD0 [0...3]=0011, PD1[0...3]=0101 and N_PD(0)=0 & 0=0, the following then occurs:

| at i | = 1; |
|---|---|
| win0 (1) | = 1 & [ 0 | ( 1 & 1 ) ] = 1; |
| win1 (1) | = 1 & [ 0 | ( 1 & 1 ) ] = 1; |
| N_PD (1) | = ( 0 | 0 ) & ( 0 | 1 ) = 0; |
| at i | = 2; |
| win0 (2) | = 1 & [ 0 | ( 1 & 1 ) ] = 1; |
| win1 (2) | = 1 & [ 0 | ( 1 & 0 ) ] = 0; |
| N_PD (2) | = ( 0 | 1 ) & ( 1 | 0 ) = 1; |
| at i | = 3; |
| win0 (3) | = 1 & [ 1 | ( 1 & 0 ) ] = 1; |
| win1 (3) | = 0 & [ 1 | ( 0 & 1 ) ] = 0; |
| N_PD (3) | = ( 0 | 1 ) & ( 1 | 1 ) = 1; |

Thus N_PD[0...3]=0011.

Figure 3A:
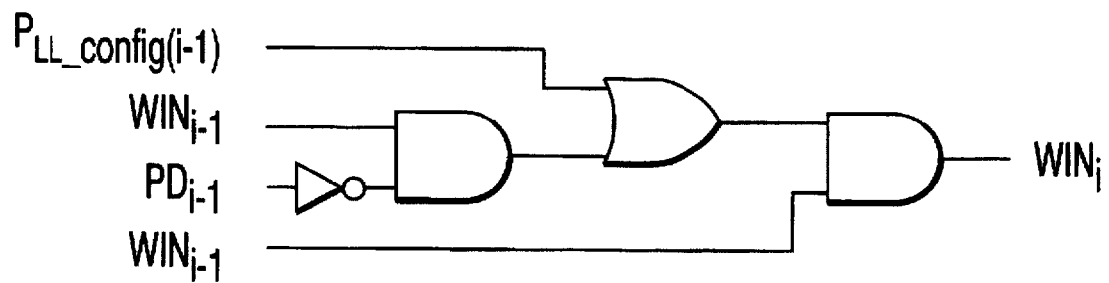
FIG. 3(a) depicts a first of two logic diagrams used for providing the operating speed of the processors.
Figure 3B:
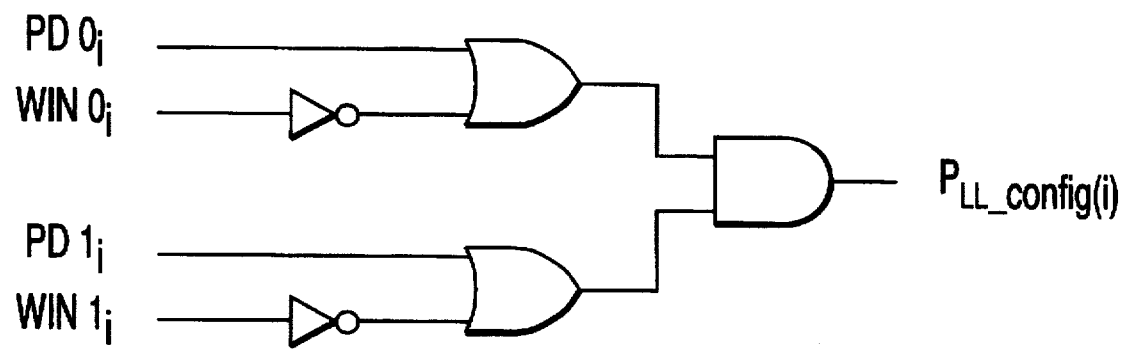
FIG. 3(b) depicts a second of the two logic diagrams used for providing the operating speed of the processors.

FIG. 3(a) and FIG. 3(b) depict logic diagrams used by the PAL 220 to implement the above algorithm when i>0. As can be seen from the algorithm, two sets of the logic diagram of FIG. 3(a) are used, one for each processor.

In sum, after detecting the operating speed of all the processors of a multi-processor system, the invention selects a speed common to all the processors (ordinarily the speed of the slowest processor) as the operating speed of all the processors. The invention also adjusts the system clock to match the operating speed of the processors. Furthermore, the invention drives the PLL configuration lines of each of the processors in order to provide the correct multiplier. The processors use this multiplier in conjunction with the system clock to operate at the speed selected by the invention.

Consequently, a failed processor of a symmetrical multi-processor system may be replaced by another processor operating at a different speed without replacing all the other processors. In addition, the invention allows the multi-processor system to be gradually updated by replacing the processors one at a time.

Although the present invention has been fully described above with reference to a specific embodiment, other alternative embodiments will be apparent to those of ordinary skill in the art. For example, the PAL 220 may be replaced by a field programmable gate array (FPGA) without departing from the scope of the invention. In addition, the processors need not be on a daughter card, they can be attached to the motherboard using their prongs. Therefore, the above description should not be taken as limiting the invention's scope which is defined by the appended claims.

What is claimed is:

1. An apparatus for allowing processors of different maximum speeds to be used in a multi-processor system comprising:

means for detecting each processor's maximum speed; and means, responsive to said detecting means, for selecting the lowest maximum speed of said processors as operating speed of said multi-processor system.

2. The apparatus of claim 1 further comprising means for adjusting said multi-processor system's clock to match said operating speed and means for providing to said processors a signal indicative thereof.

3. The apparatus of claim 2 wherein said selecting means comprises providing a multiplier to said processors, said multiplier being used in conjunction with said signal by said processors to function at said operating speed.

4. The apparatus of claim 3 wherein providing said multiplier includes driving proper Phase Locked Loop configuration lines of said processors.

5. The apparatus of claim 4 wherein said clock adjusting means includes means for selecting one of a plurality of oscillators and means for providing said selected oscillator to a clock generator.

6. The apparatus of claim 5 wherein said detecting and selecting means include using a programmable array logic (PAL) or field programmable gate array (FPGA).

7. A method of allowing processors of different maximum speeds to be used in a multi-processor system comprising the steps of:

detecting each processor's maximum speed; and selecting the lowest maximum speed of said processors as operating speed of said multi-processor system.

8. The method of claim 7 further comprising the step of adjusting said multi-processor system's clock to match said operating speed and providing to said processors a signal indicative thereof.

9. The method of claim 8 wherein said step of selecting comprises providing a multiplier to said processors, said multiplier being used in conjunction with said signal by said processors to function at said operating speed.

10. The method of claim 9 wherein said multiplier is provided by driving proper Phase Locked Loop configuration lines of said processors.

11. The method of claim 10 wherein said step of adjusting said clock includes the step of selecting one of a plurality of oscillators and the step of providing said selected oscillator to a clock generator.

12. The method of claim 11 wherein said detecting and selecting steps include the step of using a programmable array logic (PAL) or field programmable gate array (FPGA).

13. A multi-processor system capable of using processors of different maximum speeds comprising:

means for mounting said processors to said system;

means for detecting each processor's maximum speed; and means, responsive to said detecting means, for selecting the lowest maximum speed of said processors as operating speed of said multi-processor system.

14. The multi-processor system of claim 13 further comprising means for adjusting said multi-processor system's clock to match said operating speed and means for providing to said processors a signal indicative thereof.

15. The multi-processor system of claim 14 wherein said selecting means comprises providing a multiplier to said processors, said multiplier being used in conjunction with said signal by said processors to function at said operating speed.

16. The multi-processor system of claim 15 wherein providing said multiplier includes driving proper Phase Locked Loop configuration lines of said processors.

17. The multi-processor system of claim 16 wherein said clock adjusting means includes means for selecting one of a plurality of oscillators and means for providing said selected oscillator to a clock generator.

18. The multi-processor system of claim 17 wherein said detecting and selecting means include using a programmable array logic (PAL) or field programmable gate array (FPGA).

* * * * *